No. 768,452.

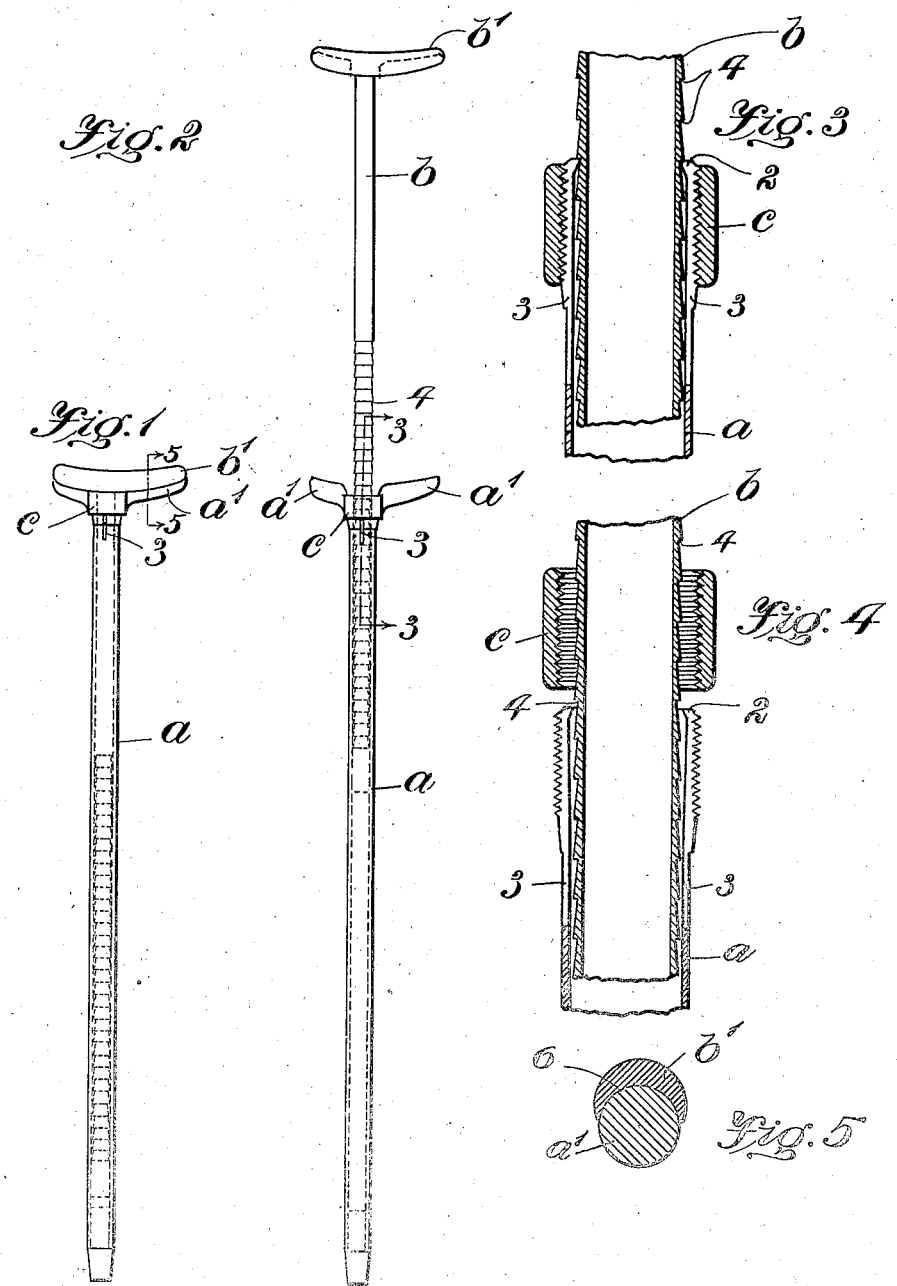

Patented August 23, 1904.

UNITED STATES PATENT OFFICE.

GEORGE J. HENNESSY, OF LONDON, ENGLAND, ASSIGNOR TO CHARLES H. PAINE, OF BOSTON, MASSACHUSETTS.

WALKING-STICK.

SPECIFICATION forming part of Letters Patent No. 768,452, dated August 23, 1904.

Application filed March 24, 1904. Serial No. 199,771. (No model.)

*To all whom it may concern:*

Be it known that I, GEORGE J. HENNESSY, of London, England, have invented certain new and useful Improvements in Walking-Sticks, of which the following is a specification.

This invention has for its object to provide an adjustable or convertible walking-stick capable of use either as a cane or a crutch and easily convertible from either form to the other.

The invention consists in the improvements which I will now proceed to describe and claim.

Of the accompanying drawings, forming a part of this specification, Figure 1 represents a side view of my improved walking-stick adjusted as a cane. Fig. 2 represents a side view of the same adjusted as a crutch. Fig. 3 represents a section on line 3 3 of Fig. 2. Fig. 4 represents a view similar to Fig. 3, showing the two members of the adjustable stick released from relative adjustment. Fig. 5 represents a section on line 5 5 of Fig. 1.

The same reference characters indicate the same parts in all the figures.

My improved adjustable walking-stick comprises a base member *a* and a member *b*, which is movable relatively to the member *a*, so that the two members may be adjusted to form a stick of minimum length adapted to serve as a cane, as shown in Fig. 1, and to form a longer stick adapted to serve as a crutch, as shown in Fig. 2. The base member *a* is preferably tubular, and the movable member *b* is formed to slide in the base member, the two members forming a telescopic stick. Means are provided for locking the two members together when the stick is extended, said means being preferably adjustable, so that the members can be locked together to form a stick of any desired length or of such length as may be suitable for the height of the person using the stick as a crutch. The locking means here shown comprise, first, a series of adjustable jaws 2 at the upper end of the base member *a*, said jaws being formed by longitudinally splitting the upper end of the base member by means of slots 3, which subdivide the upper end of the member into resilient tongues and render said upper end contractible. Means are provided for adjusting or pressing the jaws inwardly to contract the upper end of the base member, and thus engage it with the movable member, the preferred means being a collar *c*, formed to embrace the contractible portion of the base member and adapted to exert inward pressure thereon. The collar *c* is preferably internally threaded and engaged with an external thread formed on the contractible portion of the base member, the arrangement being such that when the collar is adjusted in a downward direction it will force the jaws 2 inwardly against the movable member *b*. The movable member is preferably provided with a plurality of peripheral shoulders 4, formed to engage the jaws 2, as shown in Fig. 3, and thus firmly support the movable member against downward pressure.

The movable member *b* is provided at its upper end with an upper head *b'*, which preferably extends transversely or crosswise of the length of the member *b* and is formed to serve as the arm-rest of a crutch. The base member *a* is also preferably provided with a lower head *a'*, which is here shown as supported by the collar *c*, the head *a'* being preferably formed by two arms projecting from opposite sides of said collar, as clearly shown in Fig. 2. When the stick is adjusted as a crutch, the head *b'* constitutes an arm-rest and the head *a'* a hand-grip. The said heads are formed so that when the stick is contracted to form a cane the heads will coöperate in forming a single hand-grip or cane-handle, as shown in Figs. 1 and 5. Preferably one of the heads has a recess 6, Fig. 5, which receives a portion of the other head, the two heads being thus nested, so that they collectively form a hand-grip of convenient form to be grasped by the user of the stick when adjusted as a cane.

It will be seen that when the collar *c* is adjusted to release the jaws 2, as shown in Fig. 4, the said jaws spring outwardly and release the member *b*, so that the latter can be moved endwise freely to swing or adjust the stick. When the collar *c* has returned to its operative position, it presses the jaws firmly into engagement with the movable member, thus securely maintaining the crutch adjustment of the stick.

I do not limit myself to the details of construction here shown, as the same may be variously modified without departing from the spirit of my invention as pointed out in the appended claims.

The means for locking the movable member $b$ to the base member $a$ are positive in their action, so that when the movable member is elevated and used as a part of a crutch there will be no possibility of accidental slipping of said member in the base member. It will be seen that this provision for positively locking the two members together is important, as it prevents liability of a serious accident, which might result from the downward slipping of the member $b$ in the base member $a$.

I claim—

1. An adjustable walking-stick comprising a base member having a lower head, a movable member slidingly engaged with the base member and having an upper head, the said heads being adapted to meet and form a hand-grip, and means for locking the movable member to the base member to maintain the stick in an extended condition with the upper head in position to serve as an arm-rest and the lower head in position to serve as a hand-grip.

2. An adjustable walking-stick comprising a base member having a lower head, a movable member slidingly engaged with the base member and having an upper head, and means for positively locking the movable member to the base member in different positions, said means comprising a series of locking-shoulders on the movable member, adjustable locking-jaws on the base member, and means for holding said adjustable jaws positively engaged with a shoulder on the movable member.

3. A telescopic walking-stick comprising a tubular base member having a contractible upper portion, a member movable in said base member and having a transversely-extending head at its upper end, a collar movable on the upper portion of the base member to contract the same, and a head supported by said collar and adapted to coöperate with the head on the movable member in forming a hand-grip when the stick is contracted, the said heads serving respectively as an arm-rest and a hand-grip when the stick is extended.

4. A telescopic walking-stick comprising a tubular base member having an externally-threaded, longitudinally split upper contractible portion, a member movable in said base member and having a transversely-extending head at its upper end, an internally-threaded collar formed to engage said split threaded portion to contract the same, and a head supported by said collar.

5. A telescopic walking-stick comprising a tubular base member having a contractible upper portion with internal jaws, a member movable in said base member and having a transversely-extending head and a series of peripheral shoulders, and means for contracting the upper portion of the base member to engage its jaws with a shoulder on the movable member.

6. An adjustable walking-stick comprising a base member having a transversely-extending head, a movable member slidingly engaged with the base member and having also a transversely-extending head, and means for locking the members together when the movable member is extended, one of said heads being recessed to receive the other head, whereby the heads may be nested to form a hand-grip when the stick is contracted, one of the heads forming an arm-rest and the other a hand-grip when the stick is extended.

In testimony whereof I have affixed my signature in presence of two witnesses.

GEORGE J. HENNESSY.

Witnesses:
R. WESTACOTT,
ALFRED NUTTING.